(12) United States Patent
Hatano

(10) Patent No.: US 8,550,573 B2
(45) Date of Patent: Oct. 8, 2013

(54) METHOD OF ELIMINATING SEIZURE OF SLAVE CYLINDER OF BRAKE DEVICE

(75) Inventor: Kunimichi Hatano, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 191 days.

(21) Appl. No.: 13/254,516

(22) PCT Filed: Mar. 15, 2010

(86) PCT No.: PCT/JP2010/054328
§ 371 (c)(1),
(2), (4) Date: Sep. 2, 2011

(87) PCT Pub. No.: WO2010/106993
PCT Pub. Date: Sep. 23, 2010

(65) Prior Publication Data
US 2011/0316328 A1 Dec. 29, 2011

(30) Foreign Application Priority Data
Mar. 16, 2009 (JP) .................................. 2009-063077

(51) Int. Cl.
*B60T 13/128* (2006.01)
*B60T 13/16* (2006.01)

(52) U.S. Cl.
USPC .................... 303/122.04; 303/116.1; 303/10; 60/582; 60/567

(58) Field of Classification Search
USPC ............... 303/3, 10, 20, 116.1, 116.4, 122.1, 303/122.11, 122.12, 122.04, 122.05, 303/122.14, 117.1, 115.1, 115.2; 60/582, 60/567
See application file for complete search history.

(56) References Cited

U.S. PATENT DOCUMENTS

| | | | |
|---|---|---|---|
| 4,286,255 A * | 8/1981 | Siy | 382/123 |
| 5,332,303 A | 7/1994 | Wupper | |
| 7,488,047 B2 * | 2/2009 | Hatano et al. | 303/122.09 |
| 7,988,241 B2 * | 8/2011 | Ishii | 303/122.12 |
| 8,328,297 B2 * | 12/2012 | Hatano | 303/115.1 |
| 2006/0082217 A1 * | 4/2006 | Hatano et al. | 303/122 |
| 2007/0278855 A1 * | 12/2007 | Hatano | 303/116.1 |
| 2008/0079309 A1 * | 4/2008 | Hatano et al. | 303/113.5 |
| 2008/0210496 A1 | 9/2008 | Ishii | |
| 2010/0001577 A1 * | 1/2010 | Hatano | 303/3 |

FOREIGN PATENT DOCUMENTS

| | | |
|---|---|---|
| JP | 5-502644 A | 5/1993 |
| JP | 2008-174169 A | 7/2008 |

*Primary Examiner* — Anna Momper
(74) *Attorney, Agent, or Firm* — Carrier Blackman & Associates, P.C.; Joseph P. Carrier; William D. Blackman

(57) ABSTRACT

In a brake device, when a piston (38A, 38B) of a slave cylinder (23) seizes at an advanced position, an out-valve (60, 61) is opened to discharge brake fluid in a wheel cylinder (16, 17; 20, 21) to a reservoir (62). Then, an in-valve (54, 56) and the out-valve (60, 61) are both closed, and a pump (64) is activated. This allows the brake fluid in the reservoir (62) to be supplied to a fluid pressure chamber (39A, 39B) of the slave cylinder (23), enabling a piston (38A, 38B) of the slave cylinder (23), which has seized at the advanced position, to be pushed back to a retreated position. When the seizure of the piston (38A, 38B) is eliminated in this way, the brake fluid pressure generated in the master cylinder (11) can be supplied to the wheel cylinder (16, 17; 20, 21) via the fluid pressure chamber (39A, 39B) of the slave cylinder (23). Accordingly, it is proposed a method of eliminating seizure of a slave cylinder of a brake device capable of the backup of a failure in the slave cylinder (23).

2 Claims, 4 Drawing Sheets

WHEN POWER IS CUT OFF
WHEN FAILURE OCCURS IN ELECTRIC MOTOR

METHOD OF ELIMINATING SEIZURE OF SLAVE CYLINDER OF BRAKE DEVICE

TECHNICAL FIELD

The present invention relates to a method of eliminating seizure of a slave cylinder of a brake device comprising: a master cylinder which generates a brake fluid pressure by a braking operation by a driver; a wheel cylinder which brakes a wheel; the slave cylinder which is disposed between the master cylinder and the wheel cylinder, and generates a brake fluid pressure in a fluid pressure chamber by a piston operated by an electric motor; an in-valve which controls communication between the fluid pressure chamber of the slave cylinder and the wheel cylinder; an out-valve which controls communication between the wheel cylinder and a reservoir; and a pump which sends brake fluid in the reservoir back to the fluid pressure chamber of the slave cylinder.

BACKGROUND ART

Such a brake device has already been known from Patent Document 1 below.

PRIOR ART DOCUMENT

Patent Document

Patent Document 1: Japanese Patent Application Laid-open No. 2008-174169

DISCLOSURE OF INVENTION

Problems to be Solved by the Invention

Incidentally, if a piston of a slave cylinder mechanically seize at an advanced position, or if a failure occurs in an electric motor of the slave cylinder while the piston is in the advanced position, the following problem occurs. An input port of a fluid pressure chamber of the slave cylinder, which communicates with a fluid pressure chamber of a master cylinder, is closed by the piston seizing at the advanced position, and consequently communication between the master cylinder and a wheel cylinder is blocked by the piston of the slave cylinder. As a result, the failure of the slave cylinder cannot be backed up by the master cylinder.

The present invention has been made in view of the above-described circumstances, and an object thereof is to easily eliminate seizure of a piston of a slave cylinder which has become incapable of moving at an advanced position.

Means for Solving the Problems

In order to attain the above object, according to the present invention, there is proposed a method of eliminating seizure of a slave cylinder of a brake device comprising: a master cylinder which generates a brake fluid pressure by a braking operation by a driver; a wheel cylinder which brakes a wheel; the slave cylinder which is disposed between the master cylinder and the wheel cylinder, and generates a brake fluid pressure in a fluid pressure chamber by a piston operated by an electric motor; an in-valve which controls communication between the fluid pressure chamber of the slave cylinder and the wheel cylinder; an out-valve which controls communication between the wheel cylinder and a reservoir; and a pump which sends brake fluid in the reservoir back to the fluid pressure chamber of the slave cylinder, the method being characterized by comprising steps of: opening the out-valve, and thereby discharging the brake fluid in the wheel cylinder to the reservoir; and closing both the in-valve and the out-valve, and then operating the pump.

Here, a rear piston 38A and a front piston 38B of an embodiment correspond to the piston of the present invention; and a rear fluid pressure chamber 39A and a front fluid pressure chamber 39B of the embodiment correspond to the fluid pressure chamber of the present invention.

Effects of the Invention

According to a feature of the present invention, when the slave cylinder is operated while the in-valve is opened and the out-valve is closed, the piston is moved forward by the electric motor, and the brake fluid pressure generated in the fluid pressure chamber is supplied to the wheel cylinder, thus enabling the wheel to be braked. When the in-valve is closed and the out-valve is opened in this state, the brake fluid in the wheel cylinder is discharged to the reservoir, thereby reducing a braking force. When the in-valve is opened and the out-valve is closed, by contrast, the brake fluid in the slave cylinder is supplied to the wheel cylinder, thereby increasing the braking force again. In this way, the braking force of the wheel cylinder can be controlled individually.

When the piston of the slave cylinder seizes at an advanced position, the out-valve is opened to discharge the brake fluid in the wheel cylinder to the reservoir. Then, the in-valve and the out-valve are both closed, and the pump is activated. This allows the brake fluid in the reservoir to be supplied to the fluid pressure chamber of the slave cylinder, enabling the piston of the slave cylinder, which has seized at the advanced position, to be pushed back to a retreated position. When the piston of the slave cylinder is pushed back to the retreated position in this way, the brake fluid pressure generated in the master cylinder can be supplied to the wheel cylinder via the fluid pressure chamber of the slave cylinder even if the piston has become incapable of moving forward. Hence, backup of a failure in the slave cylinder is possible.

EXPLANATION OF REFERENCE NUMERALS AND SYMBOLS

Figure 1:
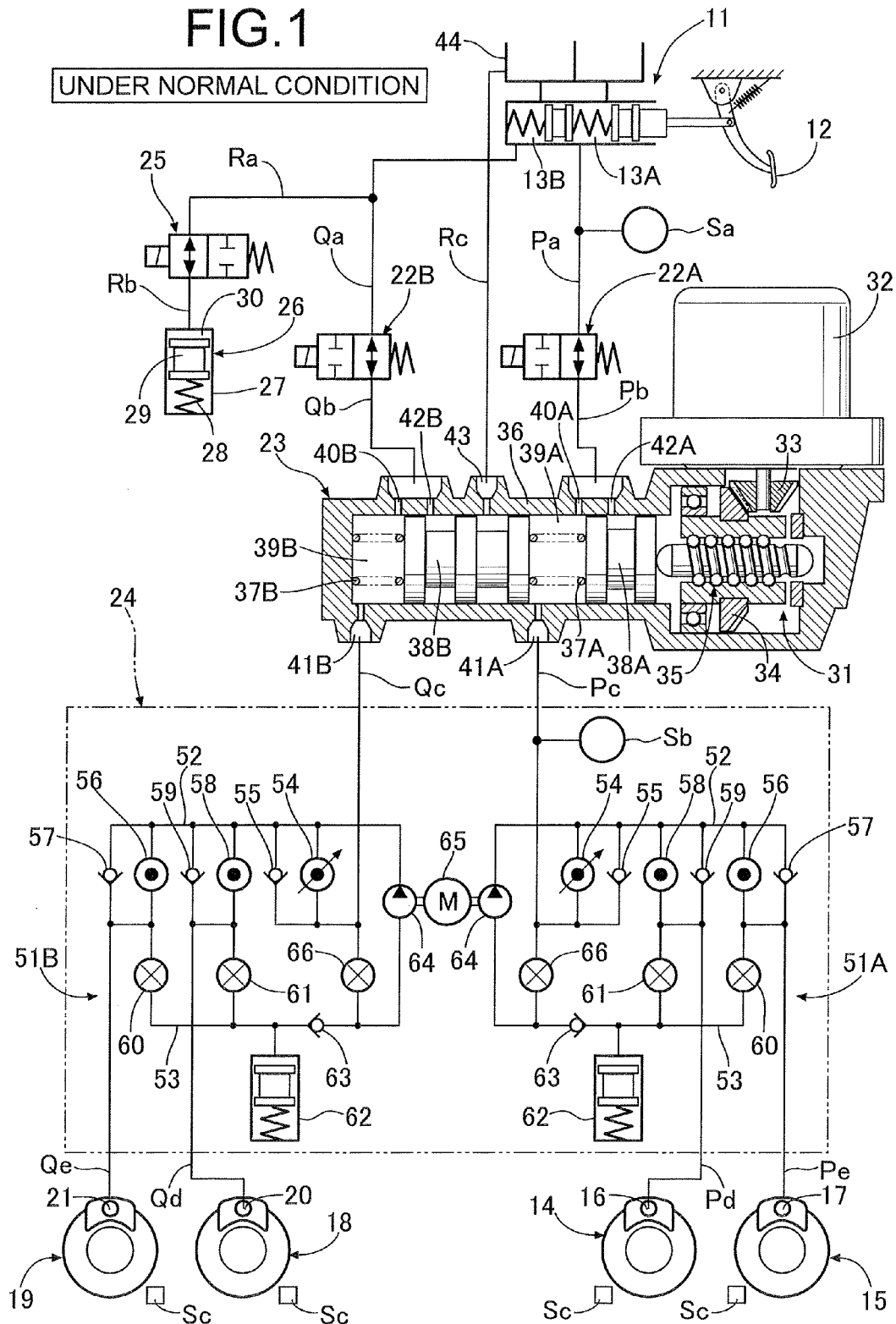
FIG. 1 is a diagram of a fluid pressure circuit of a vehicle braking device under a normal condition. (first embodiment)

11 Master cylinder
16 Wheel Cylinder
17 Wheel Cylinder
20 Wheel Cylinder
21 Wheel Cylinder
23 Slave Cylinder
32 Electric motor
38A Rear piston (piston)
38B Front piston (piston)
39A Rear fluid pressure chamber (fluid pressure chamber)
39B Front fluid pressure chamber (fluid pressure chamber)

56 In-valve
58 In-valve
60 Out-valve
61 Out-valve
62 Reservoir
64 Pump

MODE FOR CARRYING OUT THE INVENTION

A mode for carrying out the present invention is explained below based on FIG. 1 to FIG. 4.

First Embodiment

As shown in FIG. 1, a tandem master cylinder 11 includes two fluid pressure chambers 13A and 13B that output a brake fluid pressure corresponding to a depressing force from a driver depressing a brake pedal 12, one fluid pressure chamber 13A is connected to, for example, wheel cylinders 16 and 17 of disk brake devices 14 and 15 of a left front wheel and a right rear wheel via fluid paths Pa, Pb, Pc, Pd, and Pe (first system), and the other fluid pressure chamber 13B is connected to, for example, wheel cylinders 20 and 21 of disk brake devices 18 and 19 of a right front wheel and a left rear wheel via fluid paths Qa, Qb, Qc, Qd, and Qe (second system).

A cut-off valve 22A, which is a normally open electromagnetic valve, is disposed between the fluid paths Pa and Pb, a cut-off valve 22B, which is a normally open electromagnetic valve, is disposed between the fluid paths Qa and Qb, a slave cylinder 23 is disposed between the fluid paths Pb and Qb and the fluid paths Pc and Qc, and a VSA (vehicle stability assist) device 24 is disposed between the fluid paths Pc and Qc and the fluid paths Pd and Pe; Qd and Qe.

A stroke simulator 26 is connected to fluid paths Ra and Rb branching from the fluid path Qa via a reaction force allowing valve 25, which is a normally closed electromagnetic valve. The stroke simulator 26 is one in which a piston 29 urged by means of a spring 28 is slidably fitted into a cylinder 27, and a fluid pressure chamber 30 formed on the opposite side of the piston 29 to the spring 28 communicates with the fluid path Rb.

An actuator 31 of the slave cylinder 23 includes an electric motor 32, a drive bevel gear 33 provided on an output shaft thereof, a driven bevel gear 34 meshing with the drive bevel gear 33, and a ball screw mechanism 35 that is operated by the driven bevel gear 34.

A rear piston 38A and a front piston 38B urged in the backward direction by return springs 37A and 37B respectively are slidably disposed in a rear part and a front part of a cylinder main body 36 of the slave cylinder 23, and a rear fluid pressure chamber 39A and a front fluid pressure chamber 39B are defined in front of the rear piston 38A and the front piston 38B respectively.

The rear fluid pressure chamber 39A communicates with the fluid path Pb via a rear input port 40A and communicates with the fluid path Pc via a rear output port 41A, and the front fluid pressure chamber 39B communicates with the fluid path Qb via a front input port 40B and communicates with the fluid path Qc via a front output port 41B.

In FIG. 1, when the electric motor 32 is driven in one direction, the rear and front pistons 38A and 38B are moved forward via the drive bevel gear 33, the driven bevel gear 34, and the ball screw mechanism 35, and at the moment when the rear and front input ports 40A and 40B communicating with the fluid paths Pb and Qb are closed a brake fluid pressure is generated in the rear and front fluid pressure chambers 39A and 39B, thus enabling the brake fluid pressure to be outputted to the fluid paths Pc and Qc via the rear and front output ports 41A and 41B.

The structure of the VSA device 24 is known and employs the same structure for a first brake actuator 51A for controlling the first system of the disk brake devices 14 and 15 for the left front wheel and the right rear wheel and for a second brake actuator 51B for controlling the second system of the disk brake devices 18 and 19 for the right front wheel and the left rear wheel.

The first brake actuator 51A for the first system of the disk brake devices 14 and 15 for the left front wheel and the right rear wheel is explained below as being representative thereof.

The first brake actuator 51A is disposed between the fluid path Pc communicating with the rear output port 41A of the slave cylinder 23 positioned on the upstream side and the fluid paths Pd and Pe communicating respectively with the wheel cylinders 16 and 17 of the left front wheel and the right rear wheel positioned on the downstream side.

The first brake actuator 51A includes a fluid path 52 and a fluid path 53 in common for the wheel cylinders 16 and 17 of the left front wheel and the right rear wheel, and includes a regulator valve 54, which is a normally open electromagnetic valve with a variable degree of opening, disposed between the fluid path Pc and the fluid path 52, a check valve 55 disposed in parallel to the regulator valve 54 and allowing flow of brake fluid from the fluid path Pc side to the fluid path 52 side, an in-valve 56, which is a normally open electromagnetic valve, disposed between the fluid path 52 and the fluid path Pe, a check valve 57 disposed in parallel to the in-valve 56 and allowing flow of brake fluid from the fluid path Pe side to the fluid path 52 side, an in-valve 58, which is a normally open electromagnetic valve, disposed between the fluid path 52 and the fluid path Pd, a check valve 59 disposed in parallel to the in-valve 58 and allowing flow of brake fluid from the fluid path Pd side to the fluid path 52 side, an out-valve 60, which is a normally closed electromagnetic valve, disposed between the fluid path Pe and the fluid path 53, an out-valve 61, which is a normally closed electromagnetic valve, disposed between the fluid path Pd and the fluid path 53, a reservoir 62 connected to the fluid path 53, a check valve 63 disposed between the fluid path 53 and the fluid path 52 and allowing flow of brake fluid from the fluid path 53 side to the fluid path 52 side, a pump 64 disposed between the check valve 63 and the fluid path 52 and supplying brake fluid from the fluid path 53 side to the fluid path 52 side, an electric motor 65 for driving the pump 64, and a suction valve 66, which is a normally closed electromagnetic valve, disposed between the fluid path Pc and a position between the check valve 63 and the pump 64.

Here, the electric motor 65 is shared by the pumps 64 and 64 of the first and second brake actuators 51A and 51B, but it is possible to provide electric motors 65 and 65 that are exclusively used for the pumps 64 and 64 respectively.

A fluid pressure sensor Sa for detecting a brake fluid pressure is provided in the fluid path Pa extending from one fluid pressure chamber 13A of the master cylinder 11, a fluid pressure sensor Sb for detecting a brake fluid pressure generated by the slave cylinder 23 is provided in the fluid path Pc on one entrance side of the VSA device 24, and wheel speed sensors Sc are provided on the four wheels respectively.

Figure 2:
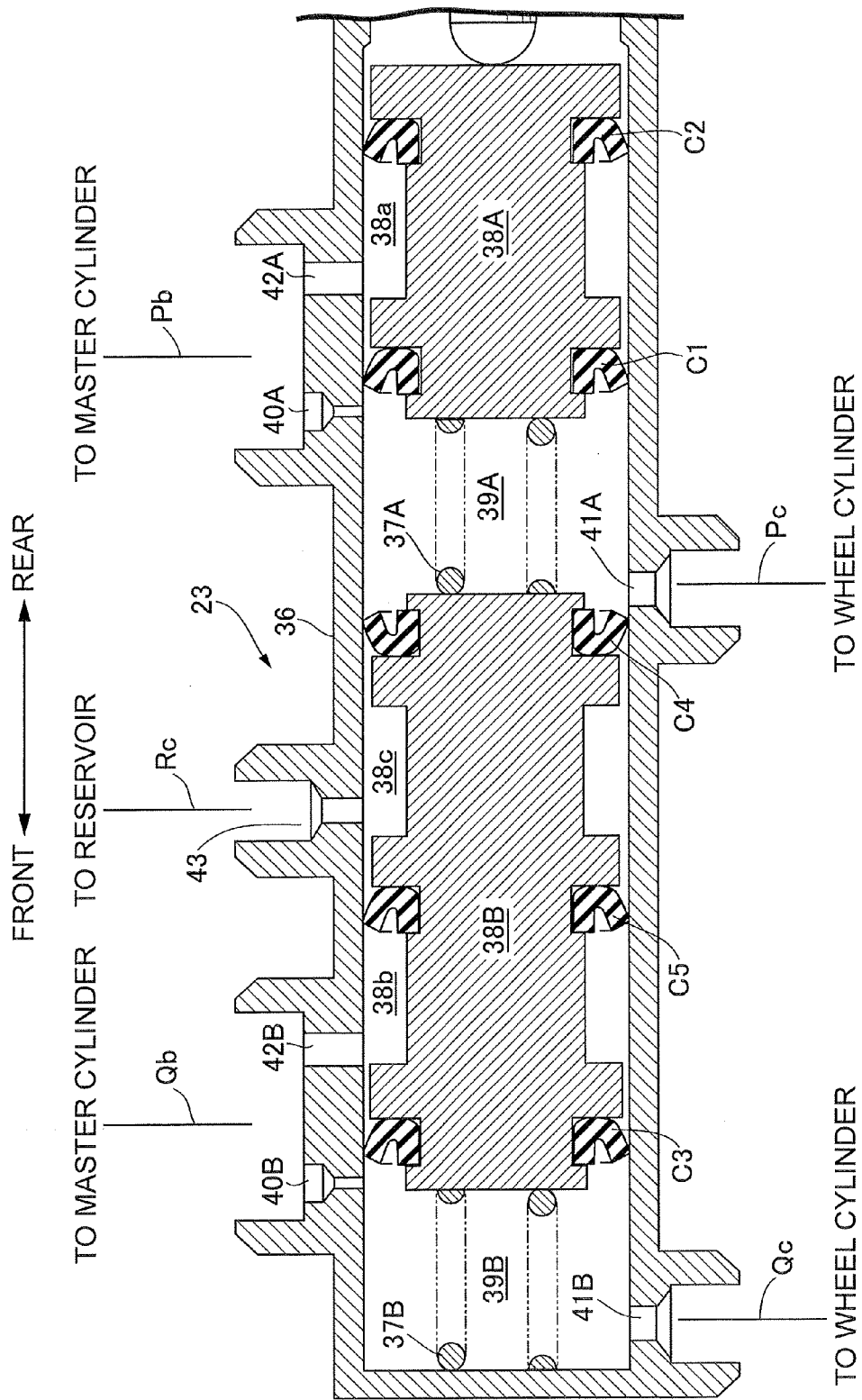
FIG. 2 is an enlarged sectional view of a slave cylinder. (first embodiment)

As is clear from FIG. 2, the rear fluid pressure chamber 39A communicates with the fluid path Pb via the rear input port 40A and a rear supply port 42A, and communicates with the fluid path Pc via the rear outlet port 41A. Moreover, the front fluid pressure chamber 39B communicates with the fluid path Qb via the front input port 40B and a first front supply port 42B, and communicates with the fluid path Qc via the front output port 41B.

A first rear cup seal C1 is provided in a front end of the rear piston 38A so as to face forward (to fulfill its sealing function in moving forward), and a second rear cup seal C2 is provided in a rear end of the rear piston 38A so as to face forward. A first front cup seal C3 is provided in a front end of the front piston 38B so as to face forward, and a second front cup seal C4 is provided in a rear end of the front piston 38B so as to face rearward (to fulfill its sealing function in moving rearward). Further, a third front cup seal C5, facing forward, is provided in an intermediate portion of the front piston 38B.

In an intermediate portion of the rear piston 38A, a rear reservoir chamber 38a sandwiched between the first and second rear cup seals C1 and C2 is formed, and the rear supply port 42A communicates with this rear reservoir chamber 38a. In a front portion of the front piston 38B, a first front reservoir chamber 38b sandwiched between the first and third front cup seals C3 and C5 is formed, and the first front supply port 42B communicates with this first front reservoir chamber 38b. Moreover, in a rear portion of the front piston 38B, a second front reservoir chamber 38c sandwiched between the second and third front cup seals C4 and C5 is formed, and a second front supply port 43 communicates with this second front reservoir chamber 38c. The second front supply port 43 communicates with a reservoir 44 of the master cylinder 11 via the fluid path Rc (see FIG. 1).

The rear fluid pressure chamber 39A is sealed by being sandwiched between the first rear cup seal C1 facing forward and the second front cup seal C4 facing rearward and reliably keeps the fluid therein, while rearward fluid leakage from the rear reservoir chamber 38a is prevented by the second rear cup seal C2 facing forward. The front fluid pressure chamber 39B is sealed by the first front cup seal C3 facing forward and reliably keeps the fluid therein, while rearward fluid leakage from the first front reservoir chamber 38b is prevented by the third front cup seal C5 facing forward.

The brake fluid in the second front reservoir chamber 38c communicating with the reservoir 44 of the master cylinder 11 via the second front supply port 43 and the fluid path Rc can flow into the rear fluid pressure chamber 39A via the second front cup seal C4 functioning as a one-way valve, and can flow into the front fluid pressure chamber 39B via the third front cup seal C5 and the first front cup seal C3 functioning as one-way valves.

The first rear cup seal C1 of the rear piston 38A is positioned immediately in the rear of the rear input port 40A while the slave cylinder 23 is not in operation. When the rear piston 38A moves forward slightly, the first rear cup seal C1 passes the rear input port 40A, and thereby a brake fluid pressure is generated in the rear fluid pressure chamber 39A. The first front cup seal C3 of the front piston 38B is positioned immediately in the rear of the front input port 40B while the slave cylinder 23 is not in operation. When the front piston 38B moves forward slightly, the first front cup seal C3 passes the front input port 40B, and thereby a brake fluid pressure is generated in the front fluid pressure chamber 39B.

An electronic control unit (not illustrated) to which signals from the fluid pressure sensors Sa and Sb and the wheel speed sensors Sc are inputted controls the operation of the cut-off valves 22A and 22B, the VSA device 24, the reaction force allowing valve 25, and the slave cylinder 32.

Next, an operation of the embodiment of the present invention having the above-mentioned arrangement is explained.

When the situation is normal and the system functions normally, as shown in FIG. 1 the cut-off valves 22A and 22B, which are normally open electromagnetic valves, are de-energized and opened, and the reaction force allowing valve 25, which is a normally closed electromagnetic valve, is energized and opened. In this state, if the fluid pressure sensor Sa provided in the fluid path Pa detects depression of the brake pedal 12 by the driver, the electric motor 32 of the slave cylinder 23 actuates, the rear and front pistons 38A and 38B move forward, and a brake fluid pressure is therefore generated in the rear and front fluid pressure chambers 39A and 39B. This brake fluid pressure is transmitted to the wheel cylinders 16 and 17; 20 and 21 of the disk brake devices 14 and 15; 18 and 19 via the opened in-valves 56 and 56; 58 and 58 of the VSA device 24, thus braking the wheels.

If the rear and front pistons 38A and 38B of the slave cylinder 23 move slightly forward, since communication between the fluid paths Pb and Qb and the rear and front fluid pressure chambers 39A and 39B is cut off, a brake fluid pressure generated by the master cylinder 11 is not transmitted to the disk brake devices 14 and 15; 18 and 19. In this process, a brake fluid pressure generated by the fluid pressure chamber 13B of the master cylinder 11 is transmitted to the fluid pressure chamber 30 of the stroke simulator 26 via the opened reaction force allowing valve 25, and moving the piston 29 against the spring 28 permits stroke of the brake pedal 12 and generates a pseudo pedal reaction force, thus eliminating any disagreeable sensation for the driver.

At this time, by controlling the operation of the slave cylinder 23 so that the brake fluid pressure detected by the fluid pressure sensor Sb provided in the fluid path Pc attains a value that is commensurate with the brake fluid pressure detected by the fluid pressure sensor Sa provided in the fluid path Pa enables a braking force that is commensurate with the depressing force applied to the brake pedal 12 by the driver to be generated in the wheel cylinders 16 and 17; 20 and 21.

Next, an operation of the VSA device 24 is explained.

When the driver depresses the brake pedal 12 in order to carry out braking, the electric motor 65 stops operating, the regulator valves 54 and 54 are de-energized and opened, the suction valves 66 and 66 are de-energized and closed, the in-valves 56 and 56; 58 and 58 are de-energized and opened, and the out-valves 60 and 60; 61 and 61 are de-energized and closed. Therefore, a brake fluid pressure outputted from the rear and front output ports 41A and 41B of the operating slave cylinder 23 is supplied from the regulator valves 54 and 54 to the wheel cylinders 16 and 17; 20 and 21 via the opened in-valves 56 and 56; 58 and 58, thus braking the four wheels.

When the driver is not depressing the brake pedal 12, driving the pumps 64 and 64 by means of the electric motor 65 in a state in which the suction valves 66 and 66 are energized and opened allows brake fluid that has been sucked from the slave cylinder 23 side via the suction valves 66 and 66 and pressurized by the pumps 64 and 64 to be supplied to the regulator valves 54 and 54 and the in-valves 56 and 56; 58 and 58. Therefore, regulating the degree of opening by energizing the regulator valves 54 and 54 so as to adjust the brake fluid pressure in the fluid paths 52 and 52 and supplying the brake fluid pressure selectively to the wheel cylinders 16 and 17; 20 and 21 via the in-valves 56 and 56; 58 and 58 that are opened by energization enables the braking forces for the four wheels to be individually controlled even in a state in which the driver is not depressing the brake pedal 12.

It is therefore possible to individually control the braking forces for the four wheels by means of the first and second brake actuators 51A and 51B, enhance the turning performance by increasing the braking force for the turning inner wheel, and enhance straight-line stability by increasing the braking force for the turning outer wheel.

Furthermore, for example, when a tendency for the left front wheel running on a road with a low coefficient of friction to lock is detected based on output of the wheel speed sensors Sc during braking by the driver depressing the brake pedal 12, after the brake fluid pressure of the wheel cylinder 16 for the left front wheel is released to the reservoir 62 so as to reduce it to a predetermined pressure by energizing and closing one in-valve 58 of the first brake actuator 51A and energizing and opening one out-valve 61, the brake fluid pressure of the wheel cylinder 16 for the left front wheel is held by de-energizing and closing the out-valve 61. If, as a result, the locking tendency of the wheel cylinder 16 for the left front wheel starts to disappear, de-energizing and opening the in-valve 58 allows brake fluid pressure from the rear output port 41A of the slave cylinder 23 to be supplied to the wheel cylinder 16 for the left front wheel so that it increases to a predetermined pressure, thus increasing the braking force.

When this increase in pressure causes the left front wheel to have a locking tendency again, repeating said pressure reducing→holding→pressure increasing enables ABS (Antilock Brake System) control for minimizing the braking distance to be carried out while suppressing locking of the left front wheel.

ABS control when the wheel cylinder 16 for the left front wheel has a tendency to lock is explained above, and ABS control can be carried out in the same manner when the wheel cylinder 17 for the right rear wheel, the wheel cylinder 20 for the right front wheel, or the wheel cylinder 21 for the left rear wheel has a tendency to lock.

Now, when the rear and front pistons 38A and 38B of the slave cylinder 23 mechanically seize at advanced positions, or when the electric motor 32 of the slave cylinder 23 becomes incapable of operating while the rear and front pistons 38A and 38B are in the advanced positions, the following problem occurs. The rear and front input ports 40A and 40B of the slave cylinder 23 are closed by the rear and front pistons 38A and 38B, and consequently communications between the master cylinder 11 and the wheel cylinders 16 and 17; 20 and 21 are blocked. As a result, the failure of the slave cylinder 23 cannot be backed up by the master cylinder 11.

Figure 3:
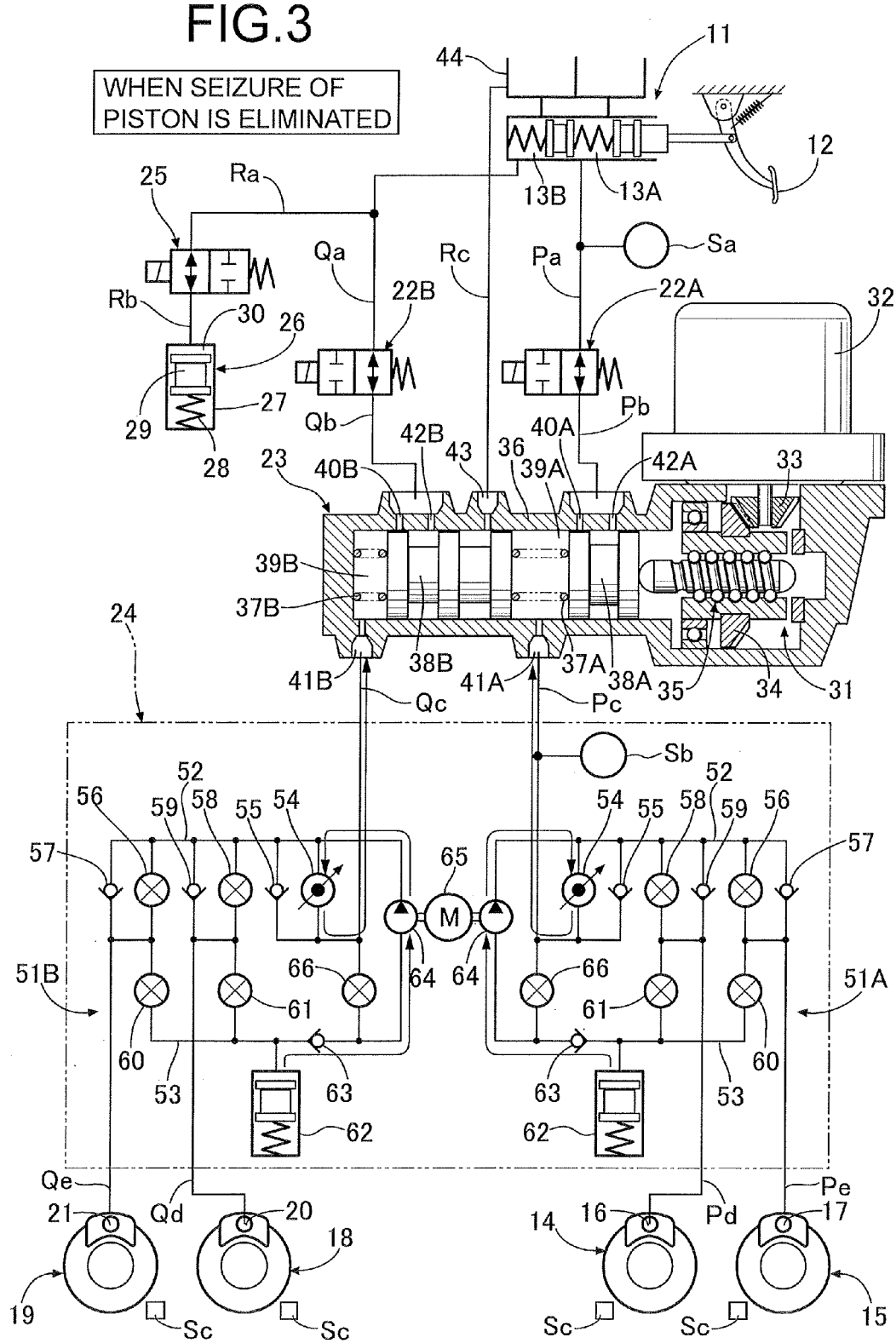
FIG. 3 is a diagram of the fluid pressure circuit when the seizure of a piston of the slave cylinder is eliminated. (first embodiment)

In such a case, firstly, the out-valves 60 and 60; 61 and 61, which are blocking between the wheel cylinders 16 and 17; 20 and 21 being braked and the reservoirs 62 and 62, are opened, and thereby the brake fluid in the wheel cylinders 16 and 17; 20 and 21 is discharged to the reservoir 62 and 62. Subsequently, as shown in FIG. 3, the pumps 64 and 64 are driven by the electric motor 65 while the in-valves 54 and 54; 56 and 56 and the out-valves 60 and 60; 61 and 61 are closed, the brake fluid stored in the reservoirs 62 and 62 is pumped up by the pumps 64 and 64 and is then discharged to the fluid paths 52 and 52.

In this state, the regulator valves 54 and 54 are opened, while the suction valves 66 and 66 are closed. Accordingly, the brake fluid discharged from the pumps 64 and 64 passes the opened regulator valves 54 and 54 and is then blocked by the closed suction valves 66 and 66. Thereby, the fluid is supplied to the rear and front fluid pressure chambers 39A and 39B of the slave cylinder 23 via the fluid path Pc and the fluid path Qc. As a result, fluid pressures of the rear and front fluid pressure chambers 39A and 39B of the slave cylinder 23 increase, and the rear and front pistons 38A and 38B seizing at the advanced positions are pushed back to retreated positions. In this way, the rear and front pistons 38A and 38B are released from the seizure state.

In the case where the seizure of the rear and front pistons 38A and 38B is due to a mechanical reason, it is considered that the seizure is solved if seizure does not occur again when the slave cylinder 23 is operated again and, as a consequence, operates properly. Meanwhile, in the case where the seizure of the rear and front pistons 38A and 38B is due to a failure of the electric motor 32, a backup is carried out by use of the brake fluid pressure generated by the master cylinder 11. In this event, the rear and front pistons 38A and 38B move rearward, and thereby the rear and front input ports 40A and 40B of the slave cylinder 23 are opened. Accordingly, the brake fluid pressure generated by the master cylinder 11 can be transferred to the wheel cylinders 16 and 17; 20 and 21 via the rear and front fluid pressure chambers 39A and 39B.

Figure 4:
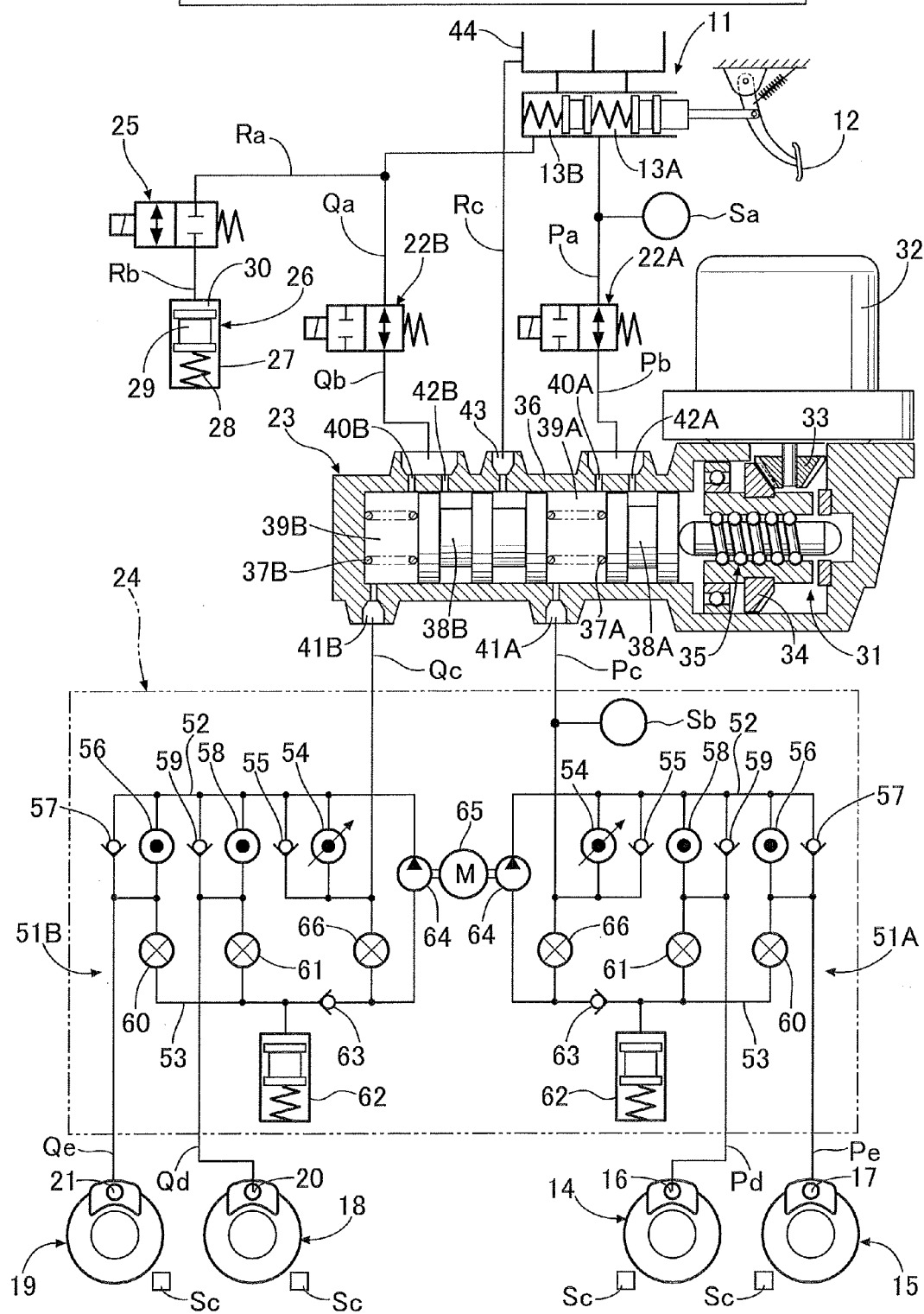
FIG. 4 is a diagram of the fluid pressure circuit when power is cut off or when a failure occurs in an electric motor of the slave cylinder. (first embodiment)

The backup by the master cylinder 11 is carried out as follows. Specifically, when the power is cut off, the cut-off valves 22A and 22B, which are normally open electromagnetic valves, are automatically opened, the reaction force allowing valve 25, which is a normally closed electromagnetic valve, is automatically closed, the in-valves 56 and 56; 58 and 58, which are normally open electromagnetic valves, are automatically opened, and the out-valves 60 and 60; 61 and 61, which are normally closed electromagnetic valves, are automatically closed, as shown in FIG. 4. Additionally, when a failure occurs in the electric motor 32 of the slave cylinder 23 without having power cutoff, the valves are controlled as in the case of power cutoff. In this state, the brake fluid pressures generated in the two fluid pressure chambers 13A and 13B of the master cylinder 11 pass the cut-off valves 22A and 22B, the rear and front fluid pressure chambers 39A and 39B of the slave cylinder 23 and the in-valves 56 and 56; 58 and 58 without being sucked by the stroke simulator 26, and thereby operate the wheel cylinders 16 and 17; 20 and 21 of the disk brake devices 14 and 15; 18 and 19 of the wheels. In this way, braking forces can be generated without any problem.

A mode for carrying out the present invention is explained above, but the present invention may be modified in a variety of ways as long as the modifications do not depart from the gist thereof.

For example, the seizure of the rear and front pistons 38A and 38B of the slave cylinder 23 is solved by use of the pumps 64 of the VSA device 24 in the embodiment. Alternatively, pumps of an ABS device instead of the VSA device 24 can be used.

In addition, the same technique can be used also when only one of the rear and front pistons 38A and 38B seizes, to solve the seizure.

The invention claimed is:

1. A method of eliminating seizure of a slave cylinder of a brake device comprising:
   a master cylinder which generates a brake fluid pressure by a braking operation by a driver;
   a wheel cylinder which brakes a wheel;
   the slave cylinder which is disposed between the master cylinder and the wheel cylinder, and generates a brake fluid pressure in a fluid pressure chamber by a piston operated by an electric motor;
   an in-valve which controls communication between the fluid pressure chamber of the slave cylinder and the wheel cylinder;
   an out-valve which controls communication between the wheel cylinder and a reservoir; and
   a pump which sends brake fluid in the reservoir back to the fluid pressure chamber of the slave cylinder,
   the method being characterized by comprising a step of:
   closing both the in-valve and the out-valve, and then operating the pump.

2. A method of eliminating seizure of a slave cylinder of a brake device according to claim 1, further comprising a step of opening the out-valve, and thereby discharging the brake fluid in the wheel cylinder to the reservoir.

\* \* \* \* \*